United States Patent
Kewekordes, II et al.

(10) Patent No.: US 11,686,656 B2
(45) Date of Patent: Jun. 27, 2023

(54) THERMAL RUNAWAY DETECTION

(71) Applicant: Automate Scientific, Inc., Berkeley, CA (US)

(72) Inventors: Josef Kewekordes, II, Berkeley, CA (US); David Gregory Barton, Berkeley, CA (US)

(73) Assignee: Automate Scientific, Inc., Berkeley, CA (US)

( * ) Notice: Subject to any disclaimer, the term of this patent is extended or adjusted under 35 U.S.C. 154(b) by 229 days.

(21) Appl. No.: 17/374,994

(22) Filed: Jul. 14, 2021

(65) Prior Publication Data
US 2023/0013263 A1    Jan. 19, 2023

(51) Int. Cl.
*G01N 1/44* (2006.01)
*F28F 27/00* (2006.01)
*G01N 1/42* (2006.01)
*G01K 1/02* (2021.01)

(52) U.S. Cl.
CPC ............... *G01N 1/44* (2013.01); *F28F 27/00* (2013.01); *G01K 1/026* (2013.01); *G01N 1/42* (2013.01)

(58) Field of Classification Search
CPC ... G01N 1/44; G01N 1/42; F28F 27/00; F24F 11/49; F24F 11/62; F24F 11/64; F24H 9/1818; F24H 9/2028; F24H 15/128; F24H 15/174; F24H 15/421; G01K 1/026
See application file for complete search history.

(56) References Cited

U.S. PATENT DOCUMENTS

| | | | | |
|---|---|---|---|---|
| 5,205,132 A | * | 4/1993 | Fu | G01R 31/2891 236/78 B |
| 5,209,398 A | * | 5/1993 | Drees | G05D 23/1931 236/9 A |
| 9,618,560 B2 | | 4/2017 | Zhao | |
| 10,061,331 B2 | | 8/2018 | Saeidi | |
| 10,601,080 B2 | | 3/2020 | Tonorio | |
| 10,684,330 B2 | | 6/2020 | Karner | |
| 2011/0210703 A1 | | 9/2011 | Souza | |

(Continued)

FOREIGN PATENT DOCUMENTS

| | | | | |
|---|---|---|---|---|
| CN | 112082290 A | * | 12/2020 | ............... F24F 11/49 |
| EP | 3223107 A2 | * | 9/2017 | ............... F24F 11/30 |

*Primary Examiner* — Francis C Gray
(74) *Attorney, Agent, or Firm* — Charles H Jew

(57) ABSTRACT

A closed-loop temperature controller employing at least two sensors: a control temperature sensor and a safety sensor at the heat-transfer element. The heat-generating element is separated from the controlled mass/volume by a transport delay so that the mass or volume that is being heated or cooled is located in a vessel which is located remotely from the heat-transfer unit. Thermally conducting fluid flows through a conduit that connects the heat-transfer unit to the vessel. Upon fluid flow interruption or control sensor removal, the temperature controller quickly detects thermal runaway before the safety sensor has reached the critical temperature. In heated systems, the temperature controller will therefore minimize direct damage and/or overshoot damage caused by excessive heat. It will also maintain the heater's output at an elevated, but non-damaging level to enable a fast recovery to the original setpoint temperature after the nonlinearity subsides.

23 Claims, 18 Drawing Sheets

(56) References Cited

U.S. PATENT DOCUMENTS

2013/0312947 A1    11/2013  Bandhauer
2022/0187859 A1*    6/2022  Santana .................. F24C 7/082
2022/0412594 A1*   12/2022  Riedl ....................... F24F 11/63

* cited by examiner

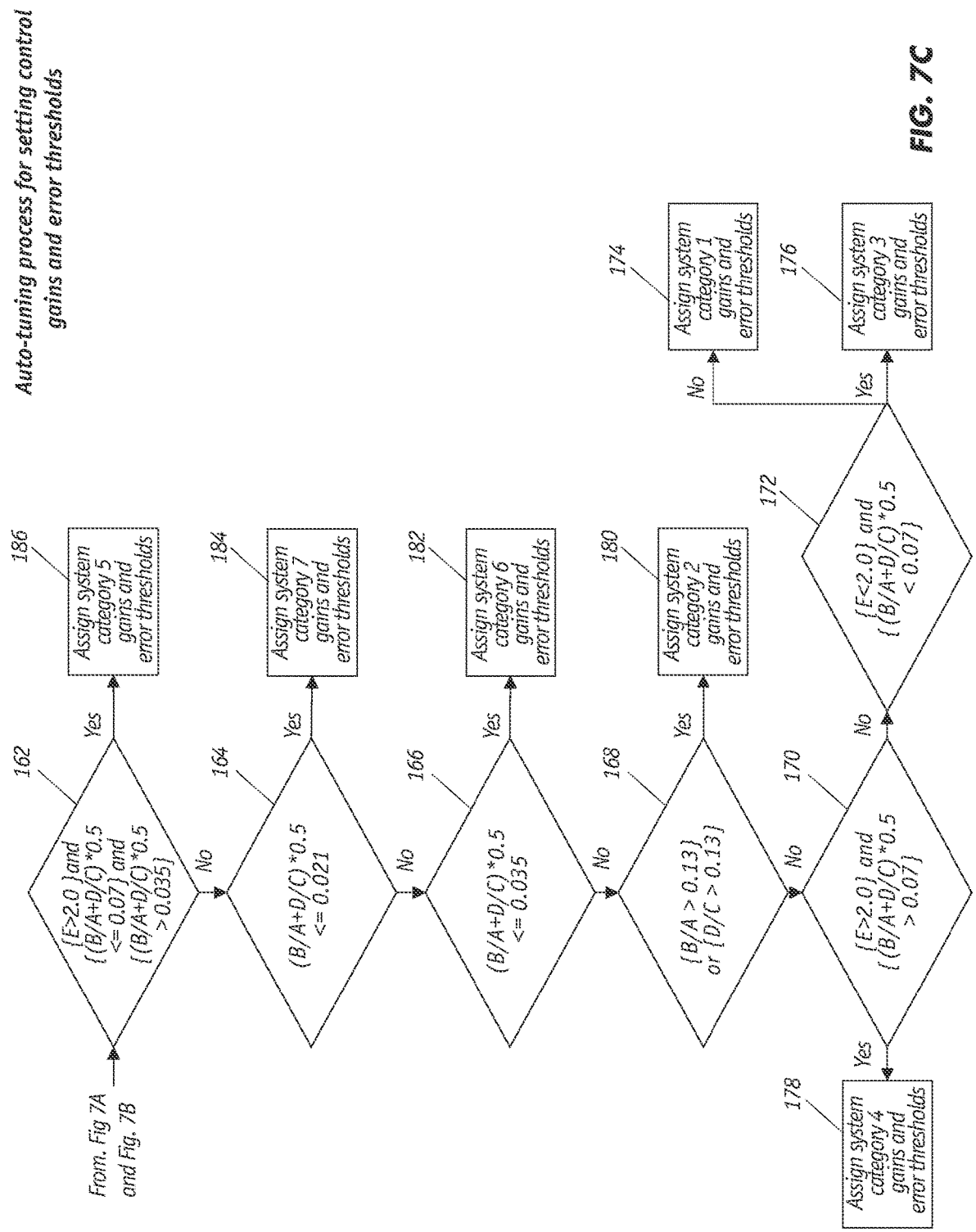

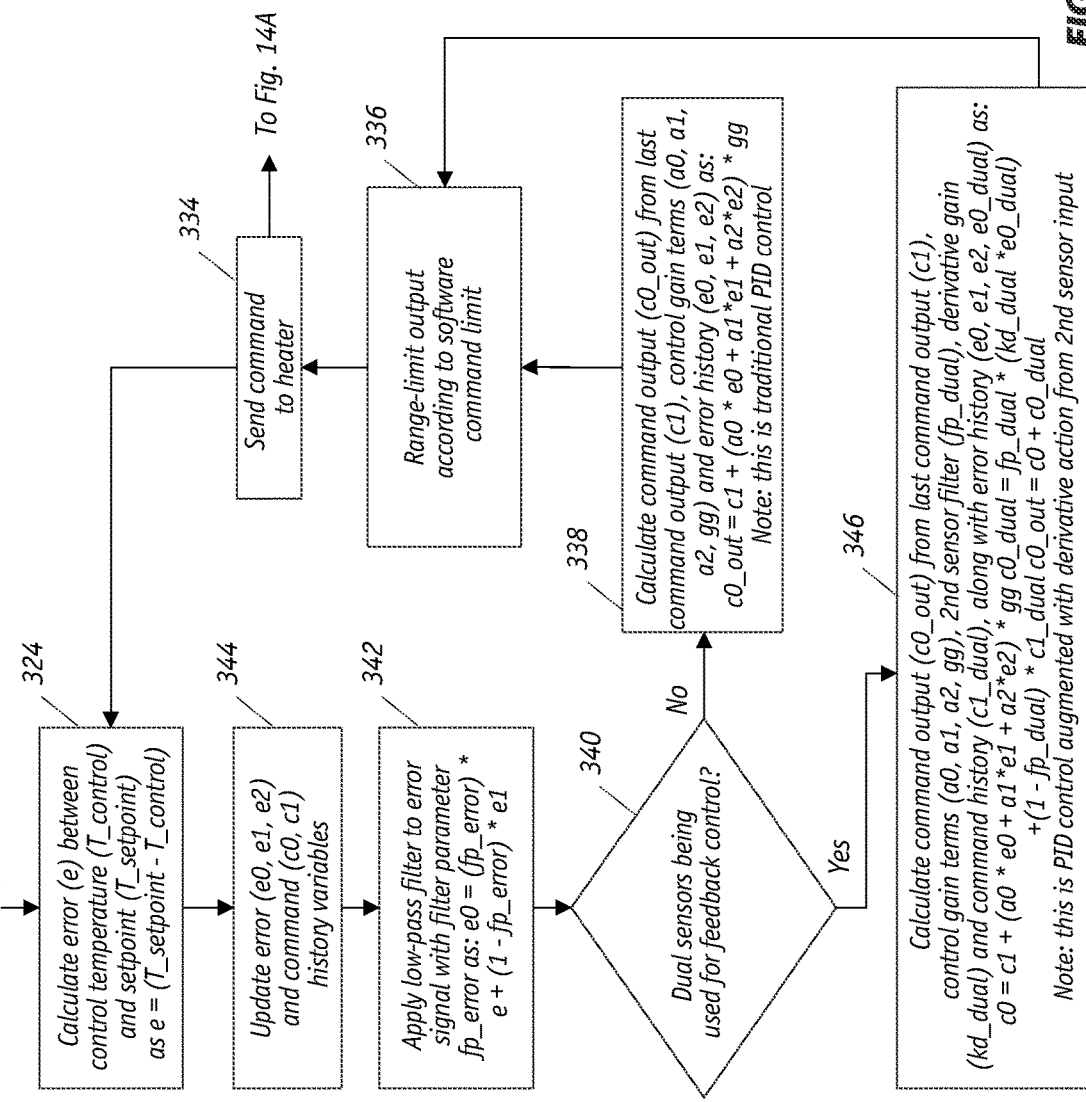

THERMAL RUNAWAY DETECTION

FIELD OF THE INVENTION

The present invention generally relates to temperature controllers that prevent thermal runaway in heating or cooling applications and, in particular, to techniques for regulating the fluid temperature in a zone or other environment using temperature sensors that monitor the temperature of the fluid in the zone or other environment as well as the temperature of circulating heated or cooled fluid generated by a heat-transfer element which is located remotely from the zone when the primary sensor is disabled or disconnected or the circulating fluid is blocked or otherwise interrupted.

BACKGROUND OF THE INVENTION

A thermostat controls the output of heating and cooling systems and is typically part of a control loop that is used to match the current operating capacity of the heating and refrigeration system to the heating or cooling load presented by the zone being heated or cooled. Typically, a sensor is located within the zone being air conditioned. The sensor senses the temperature of the zone and provides a signal representative of the sensed temperature to the thermostat. The sensor can be incorporated within the body of the thermostat, or the sensor can be used as a zone sensor providing a signal to a thermostatic controller remote from the zone under control. The thermostat receives an external command known as a setpoint which is the temperature desired to be maintained within the space. The setpoint is set manually by the user or the thermostat can have a microprocessor that has the capability to automatically change the setpoint on the occurrence of some event. For instance, in the heating season, the setpoint is usually automatically changed with the time of day to have a lower setpoint at night and a more elevated setpoint during the day. The opposite may be the case during the cooling season.

The thermostat compares the temperature information received from the sensor with the setpoint and generates an error signal. The error signal is provided to a control system within the air conditioning system. This control system functions to respond to the error signal by increasing or decreasing the temperature within the space. The control system may comprise valves, dampers, electric relays, and electric motor speed controllers, and may control a number of different pieces of air conditioning equipment in order to implement the temperature change that is commanded by the error signal Such equipment may include a heat exchanging coil, fan, steam generator, or other means of heat exchange.

In certain situations, the sensor can become disconnected from the controlled system. For instance, when the door of the room with the thermostat which has a sensor is closed but there is no heater or vent in the room, the thermostat will instruct the heater to heat the house to the setpoint, e.g., 80° F. (26.7° C.), but none of that heat will reach the thermostat in the closed room. As the temperature in the closed room continues to cool on a cold day, the rest of the house gets increasingly hot, potentially well over the 80° F. (26.7° C.) setpoint, because that heat is not reaching the thermostat. This is referred to as "thermal runaway." The system will heat indefinitely because it is not reaching the sensor in the thermostat. Thermal runaway could damage the heater or the environment being controlled. Temperature controllers used in a system where thermal runaway is a potential problem often have one or more backup safety temperature sensors. If the safety sensor reaches a critical temperature, the controller shuts off the system. In the example above, the furnace could have a safety temperature sensor.

A safety sensor as described above must often be set to a much higher temperature than the usual operating temperature or setpoint of the system. For example, considerable heat may be lost in the ducts between the furnace and the rooms it is heating, such that the furnace may routinely operate at 100° F. (37.8° C.). If the safety sensor on the furnace was set to disable the system at 80° F. (26.7° C.) like the thermostat, then the furnace could never heat the house to 80° F. (26.7° C.), because it actually needs to reach 100° F. (37.8° C.) to compensate for heat loss in the system. In this case, the safety sensor might be set to disable the system at 140° F. (60° C.) to allow the heater to operate at all temperatures necessary for it to heat the house to a normal range of desired temperatures, while still disabling the system in the event of thermal runaway.

Some temperature-regulated systems may allow the heater to continue to operate in a thermal runaway state rather than completely disabling the system. For example, the temperature controller may switch the heater off at 140° F. (60° C.) to keep it from overheating, but may turn it back on when it cools down to 139° F. (59.4° C.). This prevents damage to the furnace, but keeps the system operating between 139-140° F. (59.4-60° C.).

If the safety cut-off temperature is set to disable the system at a critical temperature, there may still be some undesirable consequences of thermal runaway due to the difference between normal operating temperatures and the critical setpoint. For example, the furnace may turn off at 140° F. (60° C.) before it is damaged, but the house may already be over 100° F. (37.8° C.) inside.

Even if there is no immediate damage caused by the system in thermal runaway, the excessive temperature of the system could cause damage when the "disconnection" in the system is corrected. For example, when a person returns home to the 100° F. (37.8° C.) house and opens the door to the room which contains the thermostat, the plants in that room may wilt and die as the hot air rushes in. This is an example of "overshoot." The temperature in the closed room with the thermostat may have been an acceptable 70° F. (21.1° C.), but the accumulated excess heat in the rest of the house will cause the temperature in that room to quickly overshoot the setpoint when the door is opened. The thermostat in the room will turn the heater off at 80° F. (26.7° C.), but there is so much accumulated heat in the rest of the house, that the temperature in that room may continue to rise to dangerous levels above the 80° F. (26.7° C.) setpoint even after the furnace turns off.

SUMMARY OF THE INVENTION

The present invention is based, in part, on the development of a temperature controller which detects thermal runaway in temperature-controlled systems before the safety sensor of the system has reached the critical temperature at which it will trigger. In heated systems, the temperature controller will therefore minimize direct damage and/or overshoot damage caused by excessive heat. It will also maintain the heater's output at an elevated, but non-damaging level to enable a fast recovery to the original setpoint temperature after the nonlinearity subsides. The temperature controller can also be implemented in cooled systems where thermal runaway and overshoot occur in the opposite temperature direction as compared to heated systems.

In one aspect, the invention is directed to a temperature control system that includes:

a first temperature sensor that measures a first temperature within a first region and generates first temperature signals;

a second temperature sensor that measures a second temperature within a second region and generates second temperature signals;

a heat-transfer element positioned in the second region that is configured to heat or cool the first region; and a controller which is configured to receive the first signals and the second signals and to regulate the heat-transfer element wherein, during a normal condition, the controller uses the first signals from the first temperature sensor to adjust the heat-transfer element to maintain a desired temperature in a feedback loop, and wherein the controller is adapted to determine (i) a first abnormal condition when the first temperature indicated by the first temperature signal is decreasing while the second temperature indicated by the second temperature signals is rising, wherein, in the first abnormal condition, rather than attempting to use the first signals from the first temperature sensor to adjust the heat-transfer element to maintain the desired temperature in a feedback loop, instead the controller sets the output of the heat-transfer element to enable recovery when the first abnormal condition ends; and (ii) a second abnormal condition when the first temperature indicated by the first temperature signal is increasing while the second temperature indicated by the second temperature signals is decreasing, wherein, in the second abnormal condition, rather than attempting to use the first signals from the first temperature sensor to adjust the heat-transfer element to maintain the desired temperature in a feedback loop, instead the controller sets the output of the heat-transfer element to enable recovery when the second abnormal condition ends.

Suitable temperature sensors can be a device which provides feedback to the controller: including, but not limited to, optical, chemical, electrical, visual or haptic temperature detectors. The temperature controller could be a program running on a computer, server, cloud, or a dedicated device capable of monitoring feedback and controlling the heater, or even a "dumb" electronic, mechanical, or other device capable of monitoring feedback and controlling the heater and/or cooler.

In another aspect, the invention is directed to a method of controlling the output of a heat-transfer element that is positioned in a second zone wherein the output is directed into a first zone, which includes:

(a) measuring a first temperature of a first fluid medium in the first zone;

(b) measuring a second temperature of a fluid medium in the second zone; and (c) employing a controller to regulate the heat-transfer element in response to temperature measurements made in step (a), step (b) or both steps (a) and (b), wherein the controller prevents thermal runaway of the temperature in the first zone.

In a further aspect, the invention is directed to a method of warming or cooling a sample that includes:

(a) placing the sample in a vessel;

(b) activating a heat-transfer element which is located in a region that is remote from the vessel supplying a warm or cold fluid into the vessel through a heat-transfer conduit that is in communication with the vessel;

(c) measuring a first temperature in the vessel;

(d) measuring a second temperature in the region; and (e) regulating the heat-transfer element with a controller in response to step (c), (d) or both (c) and (d), wherein the controller prevents thermal runaway of the temperature in the vessel.

In one embodiment, the invention is a closed-loop temperature controller with two sensors: a control temperature sensor and a safety sensor at the heat-transfer element, e.g., heater. The heat-generating element is separated from the controlled mass/volume by a transport delay. In other words, the mass or volume that is being heated or cooled is located in a vessel, chamber or other enclosure which is located remotely from the heat-transfer unit. The heat-transfer unit generates a heated or cooled fluid (gas or liquid) that is not contiguous with the vessel. The fluid must flow through a conduit that connects the heat-transfer unit to the vessel. The conduit functions as a transport delay so that fluid, whose temperature is monitored by the safety sensor, must physically travel a certain distance from the heat-transfer unit to the vessel, whose temperature is monitored by control sensor. The time required for the fluid to travel though the conduit depends on the size (e.g., radius) and length of the conduit and the speed of the fluid being circulated.

The algorithm used to detect thermal runaway is as follows: detect when the average temperature of the heater (as measured by the safety sensor) rises over some length of time, while the control sensor temperature decreases over time. The length of time and changes in temperature can be adjusted for both sensors to minimize false positives. Traditional heater controllers tune Proportional-Integral-Derivative (PID) gains under the assumption that they will operate on linear systems, where increases to the heater output cause the controlled temperature to rise, and decreases to the heater output cause the controlled temperature to fall. If the control sensor temperature decreases when the heater's output increases, then this represents nonlinear behavior, and the present invention detects the nonlinearity fast enough to prevent the controlled temperature from exceeding a safe range.

Nonlinear events can occur with the onset of thermal runaway. The inventive system detects at least three causes of thermal runaway in scientific or industrial settings: (1) when the control sensor is temporarily removed or isolated from the measured environment, (2) when the flow of heat-conducting medium is interrupted, or (3) when the measured control temperature deviates from the setpoint by a user-defined amount.

With the present system nonlinearities are detected by comparing the relative temperature changes of the two sensors instead of using the error signal from a single sensor. When a nonlinear event is detected, the algorithm maintains the heater's or cooler's output at an elevated, but non-damaging level to enable a fast recovery to the original setpoint temperature after the nonlinearity subsides.

Once thermal runaway has been detected, the controller implements actions to minimize the disturbance by, for example, turning the heater or cooler completely off, or switching the feedback temperature away from the disconnected control sensor to an earlier running average of the safety sensor. When the control sensor is returned to the measured location, its reported temperature rises or decreases rapidly. The controller can detect this rise/decrease to determine that the thermal runaway situation has been corrected, and normal operations can resume.

BRIEF DESCRIPTION OF THE DRAWINGS

FIGS. 7A, 7B and 7C show a flowchart for the controller in an auto-tuning process for setting control gains and error thresholds;

FIGS. 14A and 14B show a flowchart for the controller operating using the second sensor to augment feedback control during normal operation or an error state;

DETAILED DESCRIPTION OF THE INVENTION

Figure 1A:
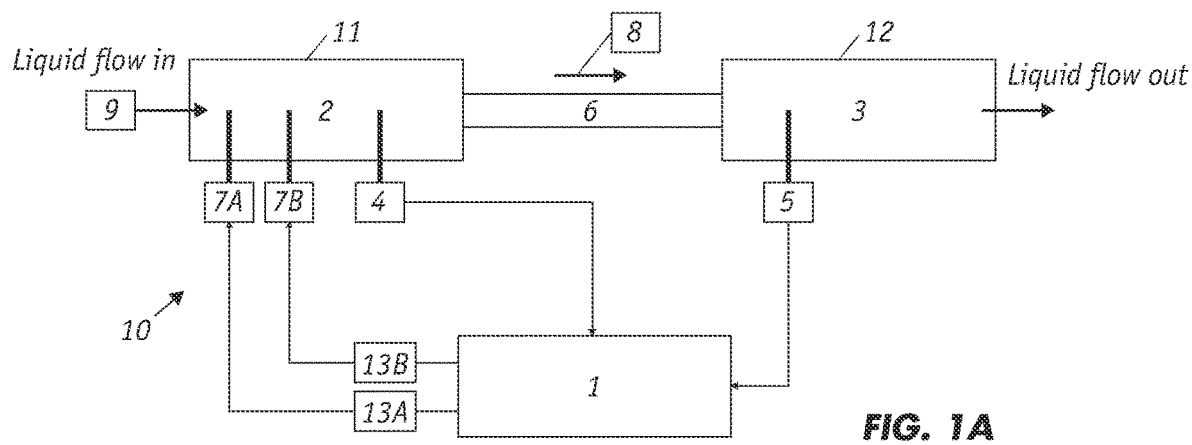
FIG. 1A illustrates the operations of a temperature controller with multi-sensor thermal runaway direction and minimization.

FIG. 1A depicts the operation of a system 10 in which a controller 1 regulates the temperature of a control bath volume 3 within housing 12. Liquid source 9 supplies a fluid such as water into a chamber 11 which defines a fluid volume 2. A heating element 7A such as a resistive heater or furnace is positioned in fluid volume 2 which is in fluid communication via conduit 6 with the control bath volume 3. The controller 1 uses device 13A, which includes an analog to digital voltage converter (ADC), to monitor the electrical current consumed by heating element 7A and to limit the control signals to the heating element 7A to prevent overheating or damage to the heating element. The temperature controller measures and limits the power to the heater to prevent overheating and damage to the heater. The electrical current limit can be set by the user, inferred by user selection of a particular type of heater, and automatically adjusted by controller observations of non-linear behavior indicating impending overheating.

A cooling element 7B such as a Peltier, air conditioner or heat pump is positioned in fluid volume 2 which is in fluid communication via conduit 6 with the control bath volume 3. The controller 1 uses device 13B, which includes an ADC, to monitor the electrical current consumed by cooling element 7B and to limit the control signals to the cooling element 7B to prevent overcooling or damage to the cooling element.

In FIG. 1A, the conduit 6 serves as transport delay between the fluid volume 2 and control bath volume 3. The diameter and length of conduit 6 are dimensioned to create a short time delay of typically of at least 1 to 5 seconds and preferably from 1 to 3 seconds for fresh heated or cooled fluid or mass flow 8 to enter into control bath volume 3. During normal operation, the controller 1 maintains the bath volume 3 at a temperature setpoint, utilizing feedback from the bath control temperature sensor 5 and/or safety sensor 4 while applying power to a heating element 7A to warm or cool fluid that flows through conduit 6.

During normal operations of system 10, the control temperature sensor 5 provides temperature feedback that the controller 1 uses to maintain the bath volume 3 at the desired temperature setpoint. However, when the controller detects any of the previously-described error states, it automatically utilizes the safety temperature sensor 4 as feedback to maintain the heated fluid temperature 8 near its temperature when the error state was detected. This prevents the controller 1 from depositing excessive heat into the heating element 7A and causing the bath volume 3 to overshoot the desired bath volume temperature.

With the present invention, the controller 1 detects when the temperature measured by the bath temperature sensor 5 falls or deviates significantly below the desired setpoint for any reason, even if it falls gradually as a result of any of the following abnormal operating conditions: (i) changing of the mass flow rate 8, (ii) reduced thermal contact between bath temperature sensor 5 and bath fluid volume 3, (iii) changing heat loss from fluid 8 during transport delay 6, and (iv) changing heat loss from bath fluid volume 3 into the surrounding environment. In particular, if the controller 1 detects a significant reduction in bath sensor 5 temperature for any reason, then it enters an error state and maintains the temperature setpoint by utilizing safety sensor 4 feedback.

Once the bath sensor 5 warms to the vicinity of the original setpoint, then the controller automatically leaves the error state and resumes normal operation, maintaining the bath volume 3 temperature based on feedback from the bath sensor 5. This thermal runaway detection is automatically disabled for a short period of time after a sensor is connected, and also upon completion of the auto-tuning process described herein, to prevent false alarms. The thresholds for this thermal runaway detection can be adjusted by a user-defined sensitivity setting.

Similarly, if while cooling the controller 1 detects when the temperature measured by the bath temperature sensor 5 rises or deviates significantly above the desired setpoint for any reason, even if it rises gradually as a result of any of the following abnormal operating conditions: (i) changing of the mass flow rate 8, (ii) reduced thermal contact between bath temperature sensor 5 and bath fluid volume 3, (iii) changing heat gain from fluid 8 during transport delay 6, and (iv) changing heat gain from bath fluid volume 3 into surrounding environment. In particular, if the controller 1 detects a significant increase in bath sensor 5 temperature for any reason, then it enters an error state and maintains the temperature setpoint by utilizing safety sensor 4 feedback. Once the bath sensor 5 cools to the vicinity of the original setpoint, then the controller automatically leaves the error state and resumes normal operation, maintaining the bath volume 3 temperature based on feedback from the bath sensor 5. This thermal runaway detection is automatically disabled for a short period of time after a sensor is connected, and also upon completion of the auto-tuning process described herein, to prevent false alarms. The thresholds for this thermal runaway detection can be adjusted by a user-defined sensitivity setting.

Figure 1B:
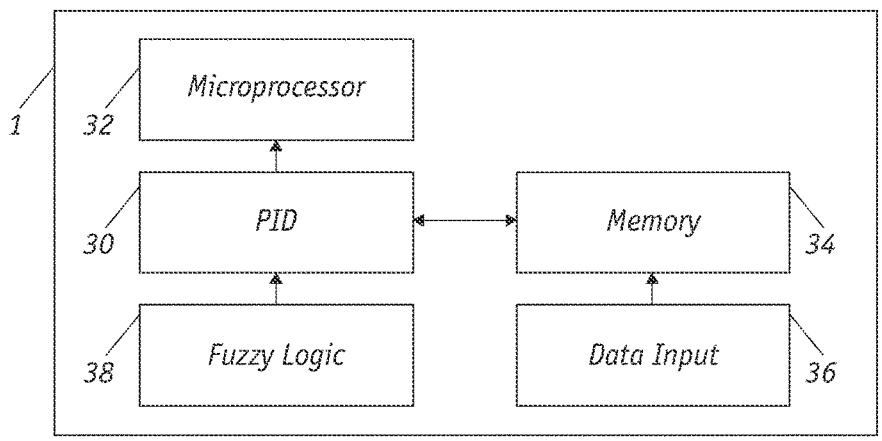
FIG. 1B is a controller.

As shown in FIG. 1B, controller 1 includes a Proportional Integral Derivative (PID) controller 30, microprocessor 32, memory 34, data input 36, and fuzzy logic 38. Microprocessor 32 is designed to perform calculations and include a means for comparing two or more numbers.

Data input means 36 is used to create a setpoint temperature to be stored in memory 34. The setpoint temperature can be varied with time and is representative of a desired temperature for an enclosed area at a particular time. Memory 34 is used to store values for the thermostat setpoint and other parameters. The PID controller 30 is a well-known device for use in control systems to reduce the error found in a control system. In a thermostat, the PID controller serves the purpose of reducing the amount of steady state error, where the steady state error is defined as the difference between the temperature measured and the thermostat set point temperature.

The PID controller calculates the amount of error between the temperature of the enclosed space and the setpoint of the thermostat, the rate of change of the error which is the derivative of the amount of error, and the total error which is the integral of the amount of error. These three signals are all multiplied by preselected constants and are then combined to produce a signal which effects when the heater or cooler is turned on or off.

Controller 1 can use a fuzzy logic module 38 with the PID controller 30 to take corrective action of the process. The module 38 typically includes input fuzzy sets, module rules, and fuzzy output sets. The controller uses "fuzzy logic" to differentiate auto-tuned gains into several speed "groups" for additional optimization of the PID parameters and other runaway detection variables.

The fuzzy logic and PID controller can be implemented in the microprocessor rather than as separate units. In particular, controller 1 can include a processor such as a microcontroller that executes codes stored in memory to implement the described controller functions. Alternatively, the controller functions can be implemented using a dedicated application specific integrated circuit (ASIC).

The control can be configured to "auto-tune" its PID gain settings by measuring the slope and time required to heat and cool the control sensor above and below the setpoint. This results in much more accurate tracking of the user-selected setpoint despite unique user circumstances (transport delay, thermal mass, ambient temperature, etc.). In addition, feedback from the safety temperature sensor can be incorporated into the repeating PID calculations to further improve the performance of the controller. Thermal runaway detection can be automatically disabled for a short period of time after a sensor is reconnected to the controller to prevent false alarms. A third variation of thermal runaway detection automatically increases the error-detection sensitivity if the difference between the setpoint and measured control temperature exceeds a user-defined threshold. This ensures that errors are triggered whenever the control temperature falls substantially below the setpoint, even if it cools gradually.

Figure 2:
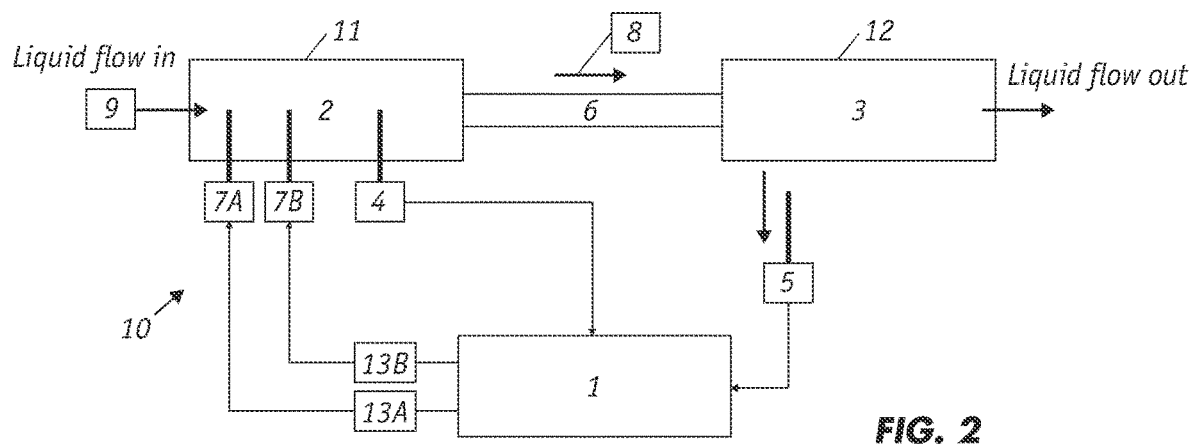
FIG. 2 illustrates the operations of the temperature controller with removal of the bath sensor.

FIG. 2 illustrates the operation of system 10 when temperature sensor 5 is removed from control bath volume 3. In particular, when the bath temperature sensor 5 falls out of the control bath volume 3 and into to the colder outside environment, the temperature sensor 5 would send signals that would normally cause the controller 1 to increase the heating element 7 power to compensate. This response in turn would cause the actual fluid temperature in the bath 3 to overshoot the desired setpoint and potentially damage test samples. With the present invention temperature controller 1 is able detect when the bath temperature sensor 5 has fallen out. Specifically, when controller 1 receives (i) bath temperature sensor 5 signals indicating a sudden temperature drop by a certain number of degrees and, shortly thereafter (ii) safety sensor 4 signals indicating a rapid rise in the temperature by a certain number of degrees in the heated fluid volume 2, these dual signal patterns indicate that the temperature sensor 7 has been displaced from the bath 3. No mechanical device is required to monitor the position of temperature sensor 5 for the controller 1 to determine that the temperature sensor 5 has been displaced, whereupon control 1 triggers an error state and changes its setpoint to a recent value of the safety temperature sensor 4.

Changing the setpoint prevents excessive heat from being generated in the heated fluid volume 2 without having to turn off the heating element completely, which would have caused the temperature of control bath volume 3 liquid temperature to undershoot the original setpoint. When the bath temperature sensor 5 is restored into the control bath volume 3 and begins to measure the warmer liquid therein and send representative signals, in response, the controller 1 automatically changes the temperature setpoint back to the original value and resumes normal operations with temperature feedback from the control bath sensor 5. This thermal runaway detection is automatically disabled for a short period of time after a sensor is connected, and also upon completion of the auto-tuning process described herein, to prevent false alarms. The thresholds for this thermal runaway detection can be adjusted by a user-defined sensitivity setting.

Figure 3:
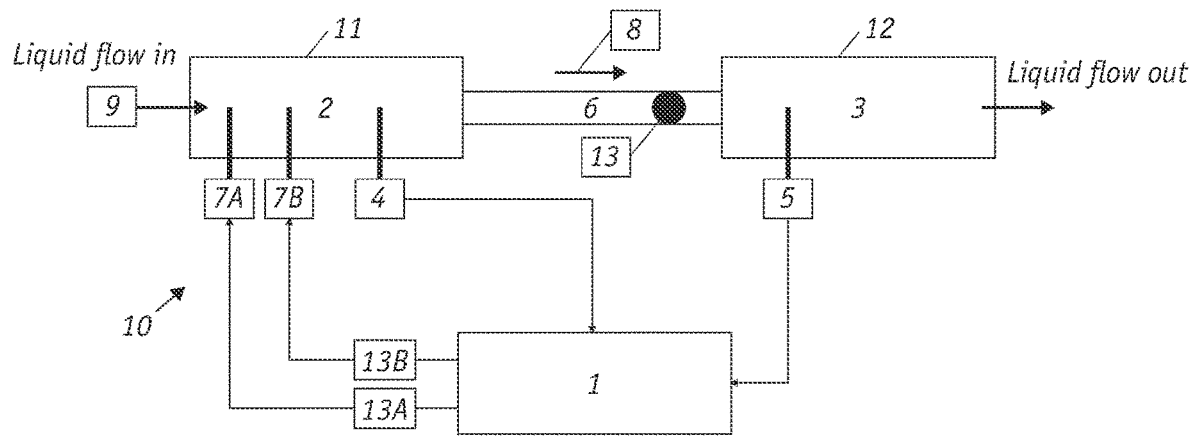
FIG. 3 illustrates the operations of the temperature controller with perfusion (thermal media) interruption detection.

FIG. 3 illustrates the operation of system 10 when an object 13 partially or fully disrupts the flow through the conduit 6. This also represents any interruption in the flow of liquid 9 including when reservoir of liquid 9 runs empty. In particular, when flow is fully or partially blocked or stopped between the heated fluid volume 2 and the bath volume 3, the temperature of the bath volume 3 would normally drop as a result of the reduced mass flow rate 8 entering the bath volume 3. Consequently, excessive heat would be deposited into the heated fluid volume 2 in response to the reduction in the bath volume 3 temperature.

With the present invention the temperature controller 1 detects interruptions (blockages) in mass flow rate 8 within conduit 6 which connects the heated volume 2 and bath volume 3. Specifically, when controller 1 receives (i) bath temperature sensor 5 signals indicating a sudden temperature drop by a certain number of degrees and, shortly thereafter (ii) safety sensor 4 signals indicating a rapid rise in the temperature by a certain number of degrees in the heated fluid volume 2, these dual signal patterns indicate the presence of blockage in conduit 6. In response, control 1 automatically changes the temperature setpoint to a recent average of the heated fluid volume 2 temperature with temperature feedback from the safety sensor 4, as described previously. This prevents excessive heat deposition into the heated fluid volume 2 from overheating the bath fluid volume 3 when the blockage 13 is removed or flow 8 resumes. When the blockage 13 is removed and mass flow 8 is restored, the control temperature 5 senses the increased warmer temperature of bath fluid volume 3. In response to signals of the higher temperature from control temperature 5, the controller 1 automatically changes the temperature setpoint back to its original value, resuming normal operation with temperature feedback from the control sensor 5 maintaining the bath volume temperature 3 at the desired setpoint. This thermal runaway detection is automatically disabled for a short period of time after a sensor is connected, and also upon completion of the auto-tuning process described herein, to prevent false alarms. The thresholds for this thermal runaway detection can be adjusted by a user-defined sensitivity setting.

During normal heating operations, the control sensor 5 provides temperature feedback that the controller 1 uses to maintain the bath volume 3 at the desired temperature setpoint. However, when the controller detects any of the previously-described error states, it automatically utilizes the safety temperature sensor 4 as feedback to maintain the heated volume temperature near its temperature when the error state was detected. This prevents the controller 1 from depositing excessive heat into the heating element 7A and causing the bath volume 3 to overshoot the desired bath volume temperature.

Figure 6:
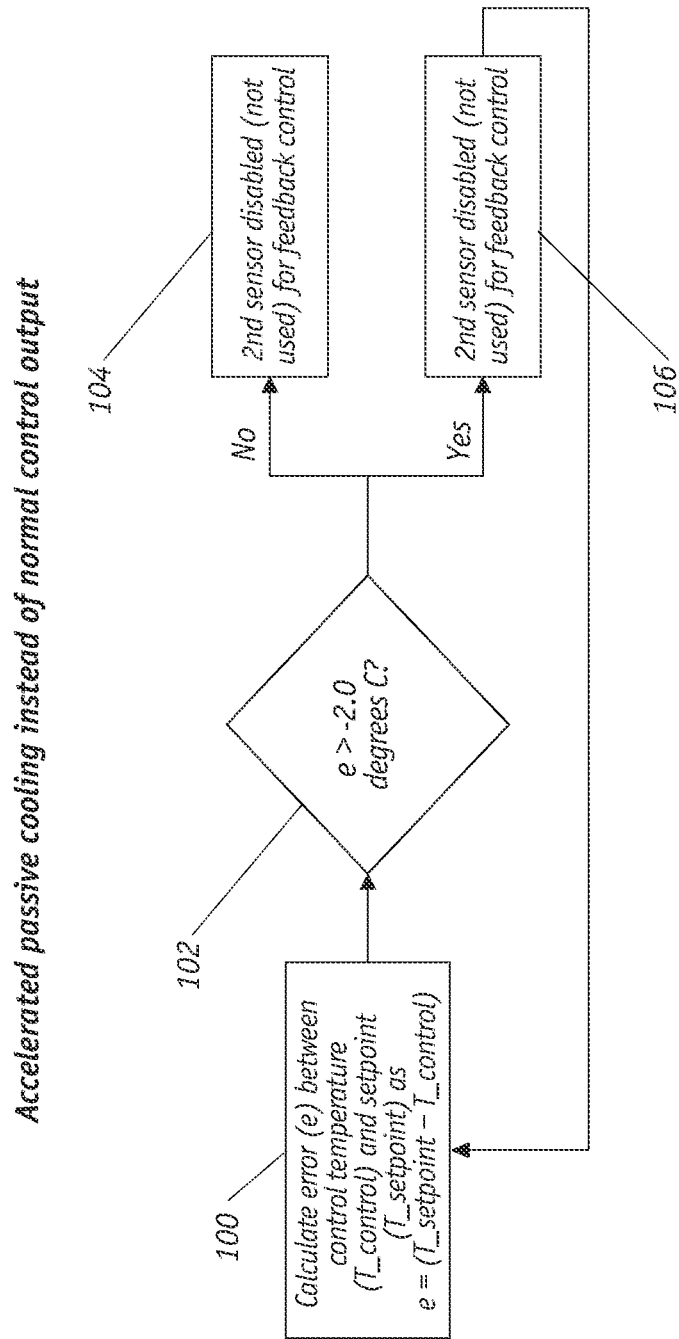
FIG. 6 is a flowchart for the controller in accelerated passive cooling instead of control output.

FIG. 6 shows when the safety sensor is used for feedback control whereby the controller prevents the temperature from rising or falling too quickly with respect to the setpoint. However, in some instances, it is desirable to allow the system to cool rapidly, such as when the user reduces the temperature setpoint from a high to a lower value. To accelerate passive cooling without compromising control performance while maintaining the setpoint, this controller as shown in steps 100, 102, 104 and 106 selectively disables the safety sensor input for feedback control whenever the feedback control temperature is more than 2 degrees C. above the setpoint.

Figure 7A:
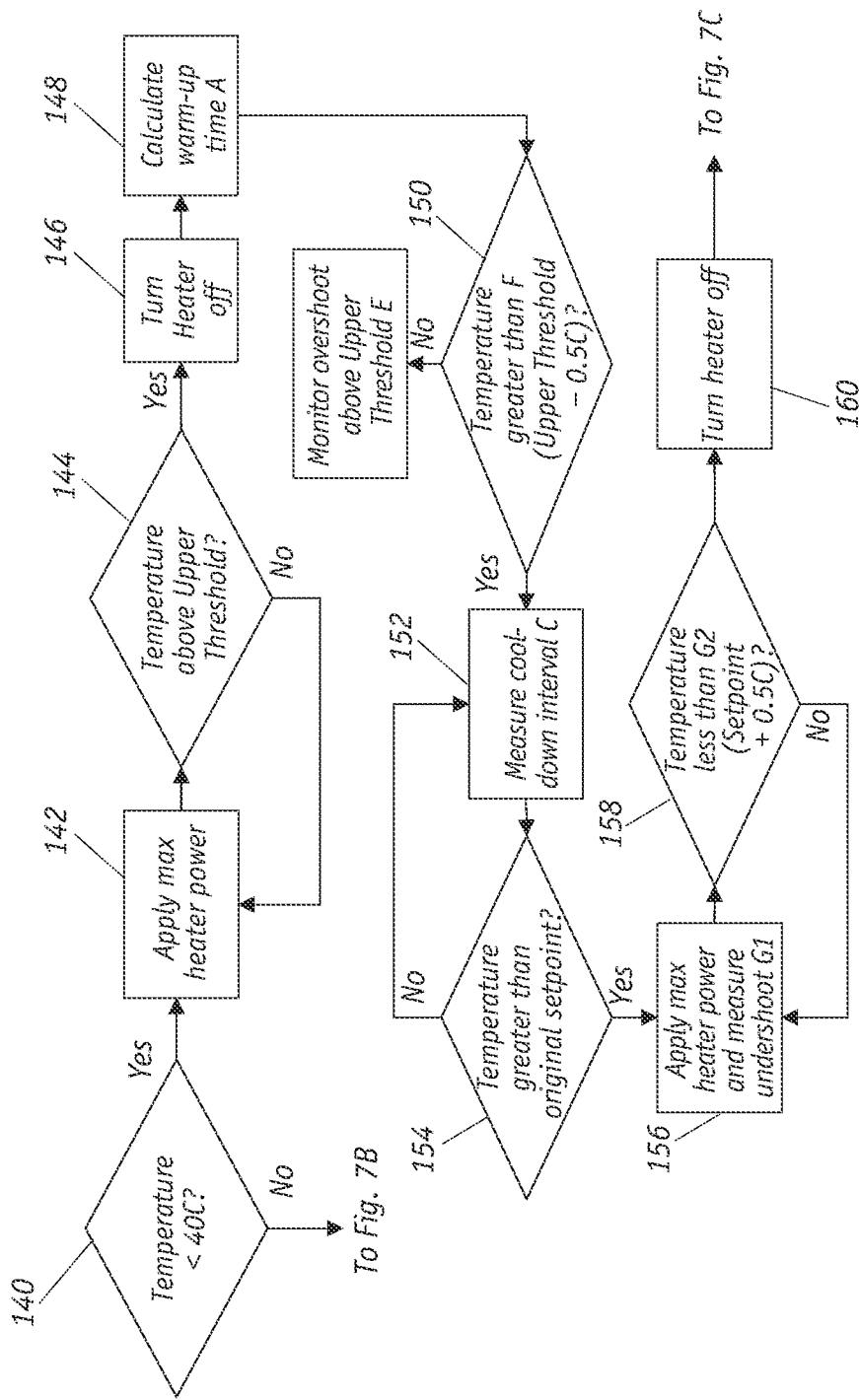
Figure 7B:
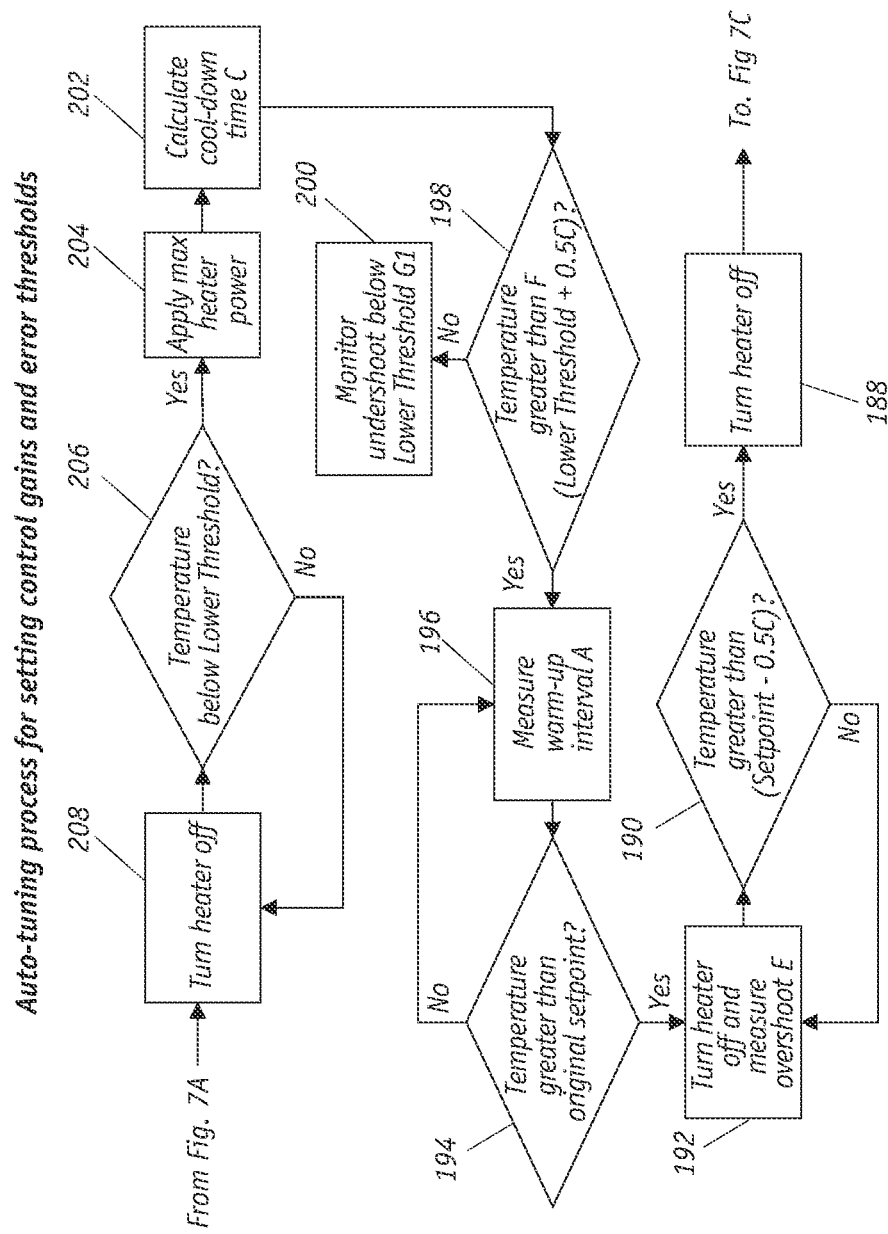

In heating applications, the temperature controller 1 can auto-tune its control algorithm based on the measured thermal response resulting from the transport delay 6, thermal mass in the bath volume 3, heating capacity of the heating element 7A, thermal mass in the heated fluid volume 2 and mass flow rate 8. FIGS. 7A, 7B and 7C show implementation of auto-tuning process for setting control gains and error thresholds. FIG. 7A implements the initial temperature measurement and comparison sequence steps 140, 142, 144, 146, 148, 150, 152, 154, 156, 158 and 160; FIG. 7B implements the second temperature measurement and comparison sequence steps 188, 190, 192, 194, 196, 198, 200, 202, 204, 206, and 208; and FIG. 7C implements the category assignment process sequence steps 162, 164, 166, 168, 170, 172, 174, 176, 178, 180, 182, 184, and 186.

Figure 4:
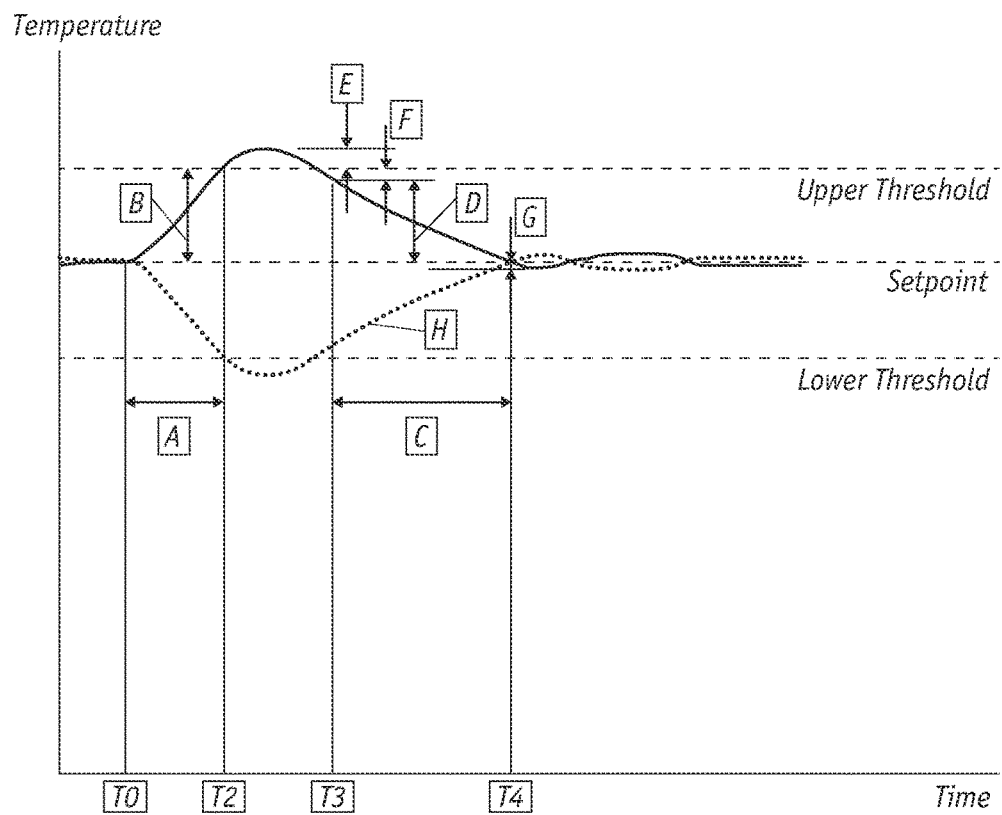
FIG. 4 is a graph of temperatures during auto-tuning.

The auto-tuning algorithm sets the linear PID control gains based on the measured response, and it also makes the following decisions: (i) Whether to utilize the safety sensor as a secondary input to the temperature control algorithm. This determines whether the controller operates as a single-input, single-output (SISO) controller or multiple-input, single-output (MISO) controller. (ii) Error detection thresholds for the behavior described above. The control gains are defined by the following procedure: (i) The controller delivers its maximum heat output (142) at time (T0) and measures the duration (A in FIG. 4) that elapses while the feedback sensor rises by amount (B) to reach the Upper Threshold, for example, which is 110% of the Setpoint value (148). The controller then sets its output to the minimum value at time (T2) and measures the amount of thermal overshoot (E) that occurs (150). After the feedback sensor has cooled by an amount (F) below the Upper Threshold, the controller measures the duration (C) required to cool back to the setpoint (152). The controller then delivers its maximum heat output at time (T4), when the system has cooled to reach the original setpoint. Finally, the controller measures the amount of undershoot (G) that occurs before the feedback sensor temperature begins warming again (156). If the feedback sensor temperature is below 40° C. at the beginning of the auto-tune routine, then the steps are performed as described above. Otherwise, the process is reversed, so the system initially cools to the Lower Threshold (for example, 90% of Setpoint Value) first, then undershoot (G) is measured, then it applies maximum heat output to warm the system back to the original setpoint and measure overshoot (E). This reversed process is shown in FIG. 4. The measured response from the auto-tune process is assigned a category based on whether the following conditions are met (evaluated in the order they are listed).

A unique set of control gains is associated with each "fuzzy logic" system category as shown in FIG. 7C: Category 5: The overshoot (E) is greater than 2.0° C. and the average of the warmup rate (B/A) and the cooldown rate (D/C) is less than or equal to 0.07° C./sec but greater than 0.035° C./sec (186) Category 7: The average of the warmup rate (B/A) and the cooldown rate (D/C) is less than or equal to 0.021° C./sec (184) Category 6: The average of the warmup rate (B/A) and the cooldown rate (D/C) is less than or equal to 0.035° C./sec (182) Category 2: Either the warmup rate or cooldown rate is greater than 0.13° C./sec (180) Category 4: The overshoot (E) is greater than 2.0° C. and the average of the warmup rate (B/A) and the cooldown rate (D/C) greater than 0.07° C./sec (178) Category 3: The overshoot (E) is less than 2.0° C. and the average of the warmup rate (B/A) and the cooldown rate (D/C) less than 0.07° C./sec (176) Category 1: Any system that does not meet the requirements for other system categories (174).

Figure 5:
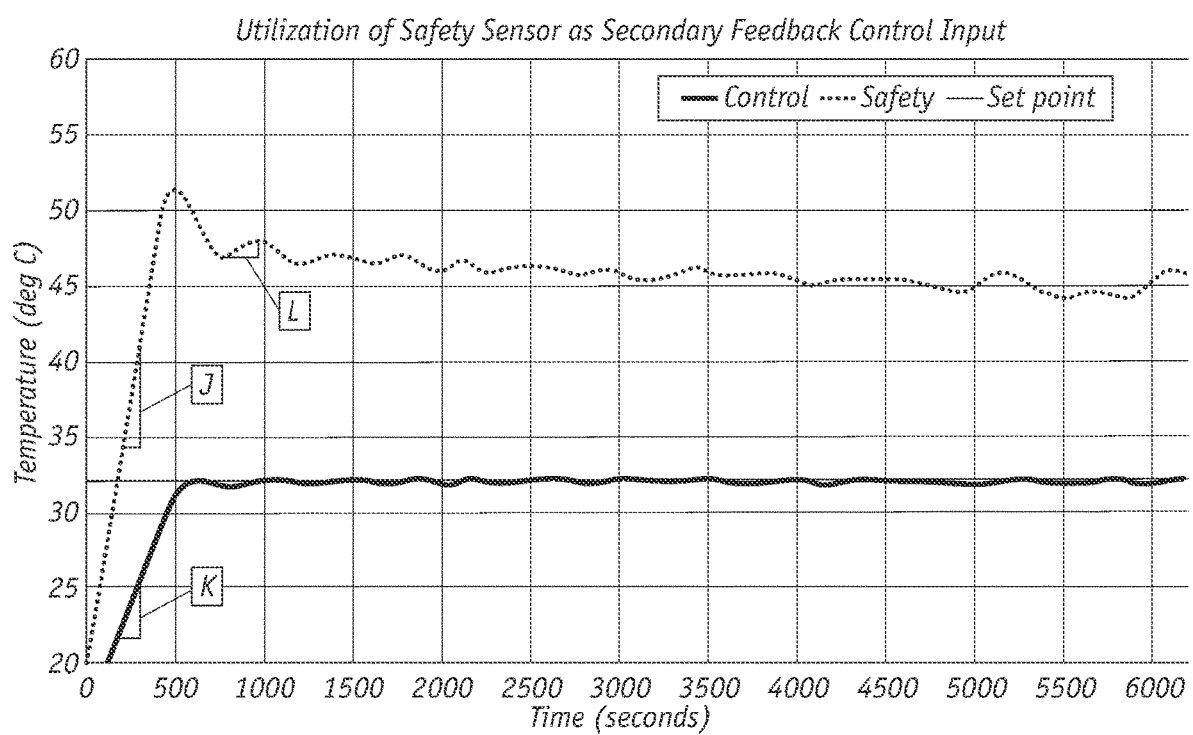
FIG. 5 is a graph of temperature control using a control and safety temperature sensor.

Based on the system category assigned during the auto-tune procedure described above, the safety sensor 4 in FIG. 1 may be utilized as a secondary input for feedback control. If utilized, then the safety sensor 4 augments the linear PID control algorithm with an additional derivative term, reducing the control output to the heating element 7A if the safety sensor temperature rises quickly, and increasing the control output if the safety sensor temperature falls quickly. This additional derivative response is complementary to the normal derivative action from the control sensor (it does not replace the control sensor's derivative action). The safety sensor 4 is directly connected to the heated volume 2, so its temperature changes more rapidly than the bath sensor 5. As a result, limiting the control output based on the safety sensor input can reduce excessive heat deposition into the heated fluid volume 2 and the thermal overshoot in the bath volume 3 that results from excessive heat deposition and the transport delay 6. The typical thermal responses of the safety sensor 4 and bath sensor 5 are shown in FIG. 5, and the rate of change of the safety sensor J is visibly greater than the rate of change of the bath (control) sensor K while the system was warming up to the setpoint. Additionally, the subsequent fluctuations in safety sensor temperature L are greater than fluctuations in control sensor temperature, so derivative action on the safety sensor allows for more precise control of the heated fluid volume 2 temperature and prevents overshoot in the bath volume 3 from excessive heat deposition.

Figure 8:
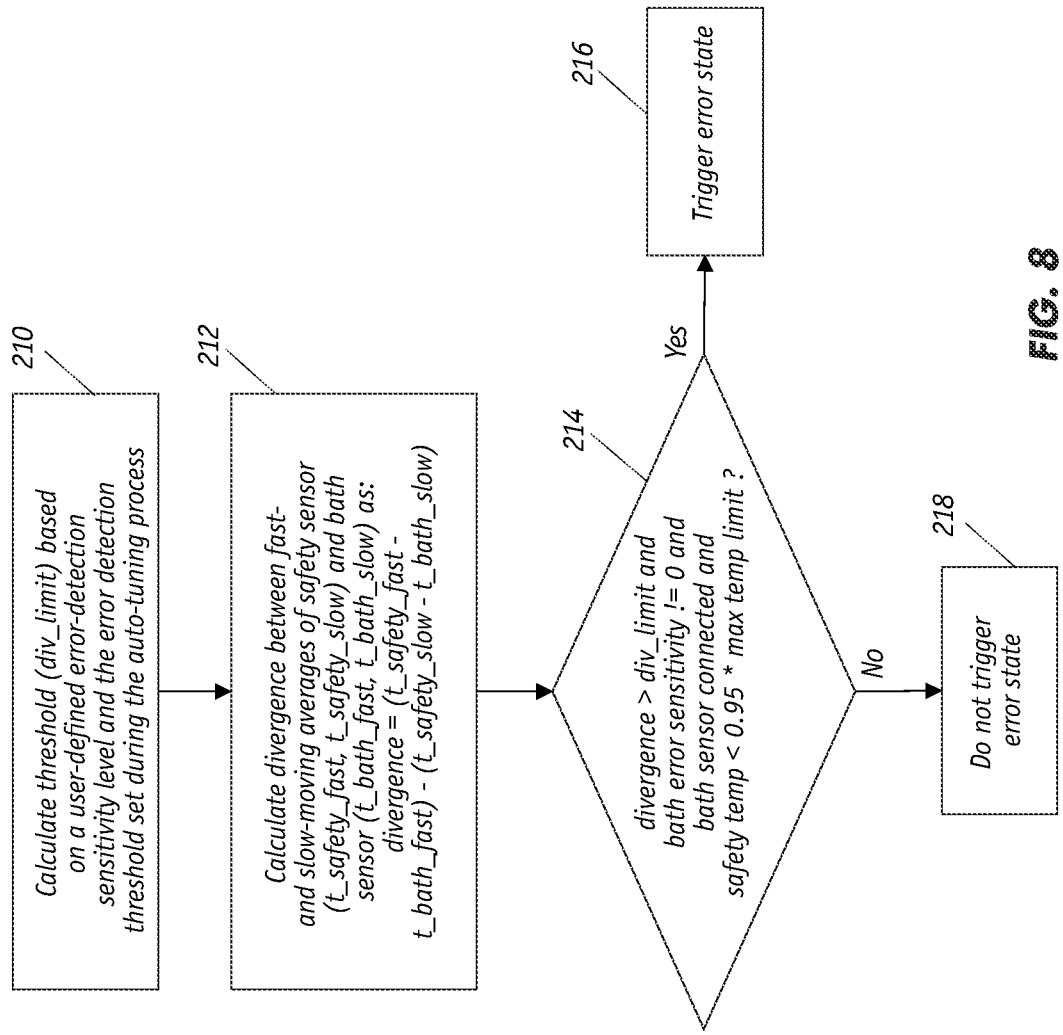
FIG. 8 is a flowchart for the controller detecting bath sensor error.

FIG. 8 shows detection of a bath sensor error whereby the controller detects 210, 212 when the bath temperature sensor 5 (FIG. 2) has fallen out 214 and either triggers 216 or does not trigger 218 an error state.

Figure 9:
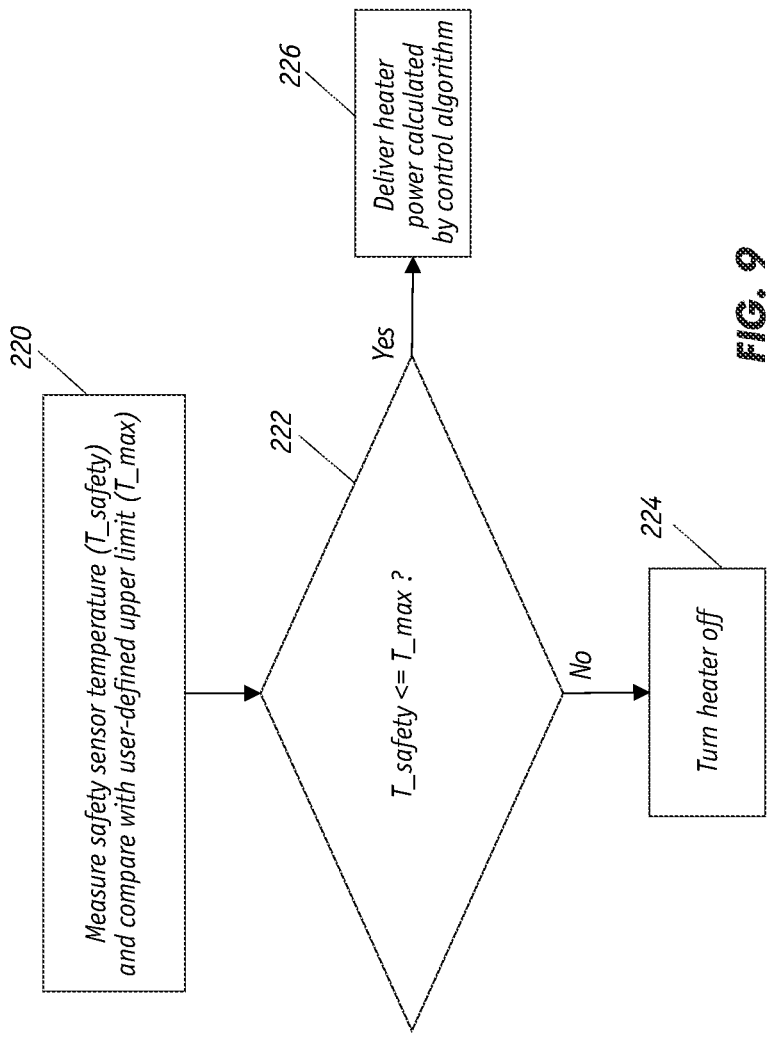
FIG. 9 is a flowchart for the controller limiting heater output using safety sensor.

FIG. 9 shows the heater is limited 220 whenever the safety sensor temperature exceeds the maximum temperature limit to prevent damage to the hardware from overheating 224, 226. This logic 222 is particularly suited whenever the bath sensor is used for feedback control since the transport delay between the heater and bath introduces the possibility for the heater to become significantly hotter than the bath temperature.

Figure 10:
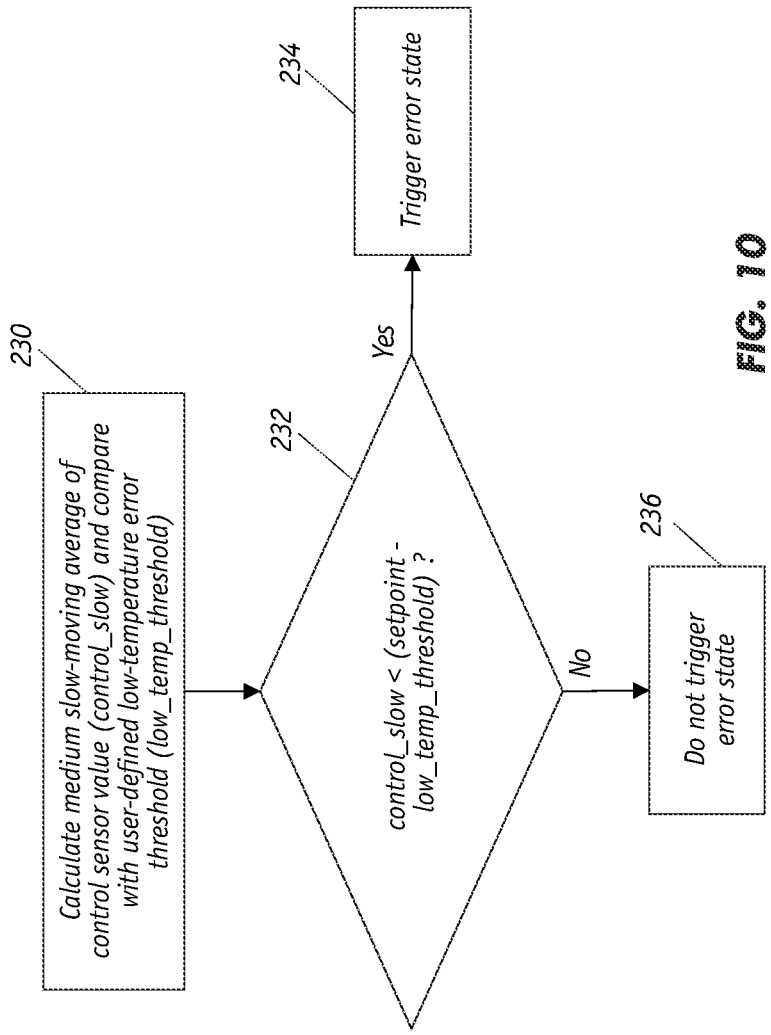
FIG. 10 is a flowchart for the controller detecting a low-temperature error.

FIG. 10 shows the controller detecting a low-temperature error 232 when the temperature measured by the bath temperature sensor 5 (FIG. 1A) falls or deviates significantly from the setpoint as described previously in which case, the controller enters into an error state 234 that it otherwise does not 236. Once the bath sensor 5 warms to the vicinity of the original setpoint, the controller returns to normal operations 330.

Figure 11:
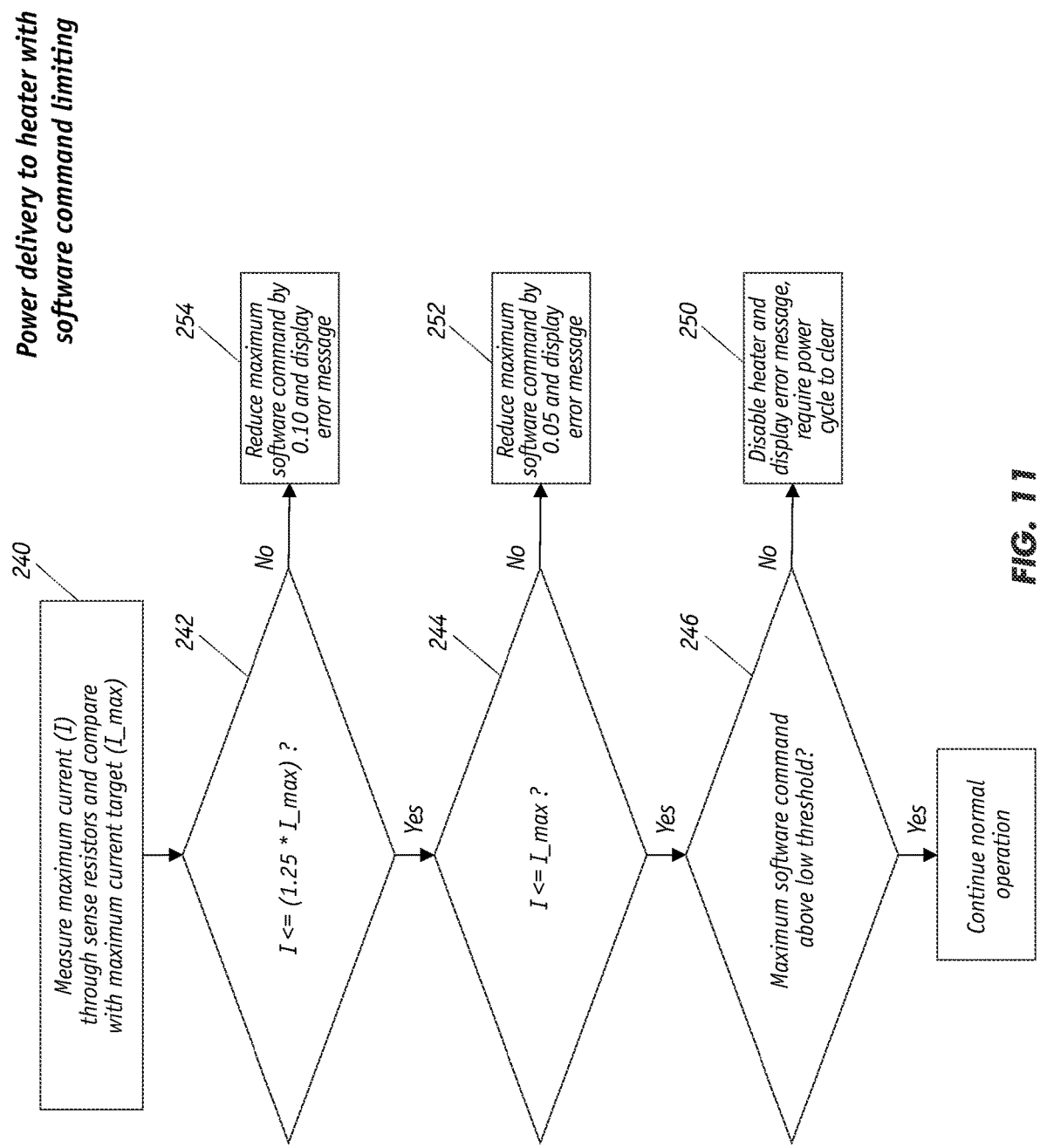
FIG. 11 is a flowchart for the controller's power delivery to the heater with software command limiting.

FIG. 11 shows how a user can adjust the desired maximum heater current in the controller's setting menu. The controller constantly monitors the actual current 240 through the heater channels and reduces the maximum control output command (software limit) if overcurrent is detected 242, 244, 252, 254. In the event overcurrent is detected but the maximum software command has already been reduced by a value that is lower than expected during normal operations 246, then the system will display an error message and disable the heater 250, thereby requiring the user to power-cycle the controller to clear the error.

Figure 12:
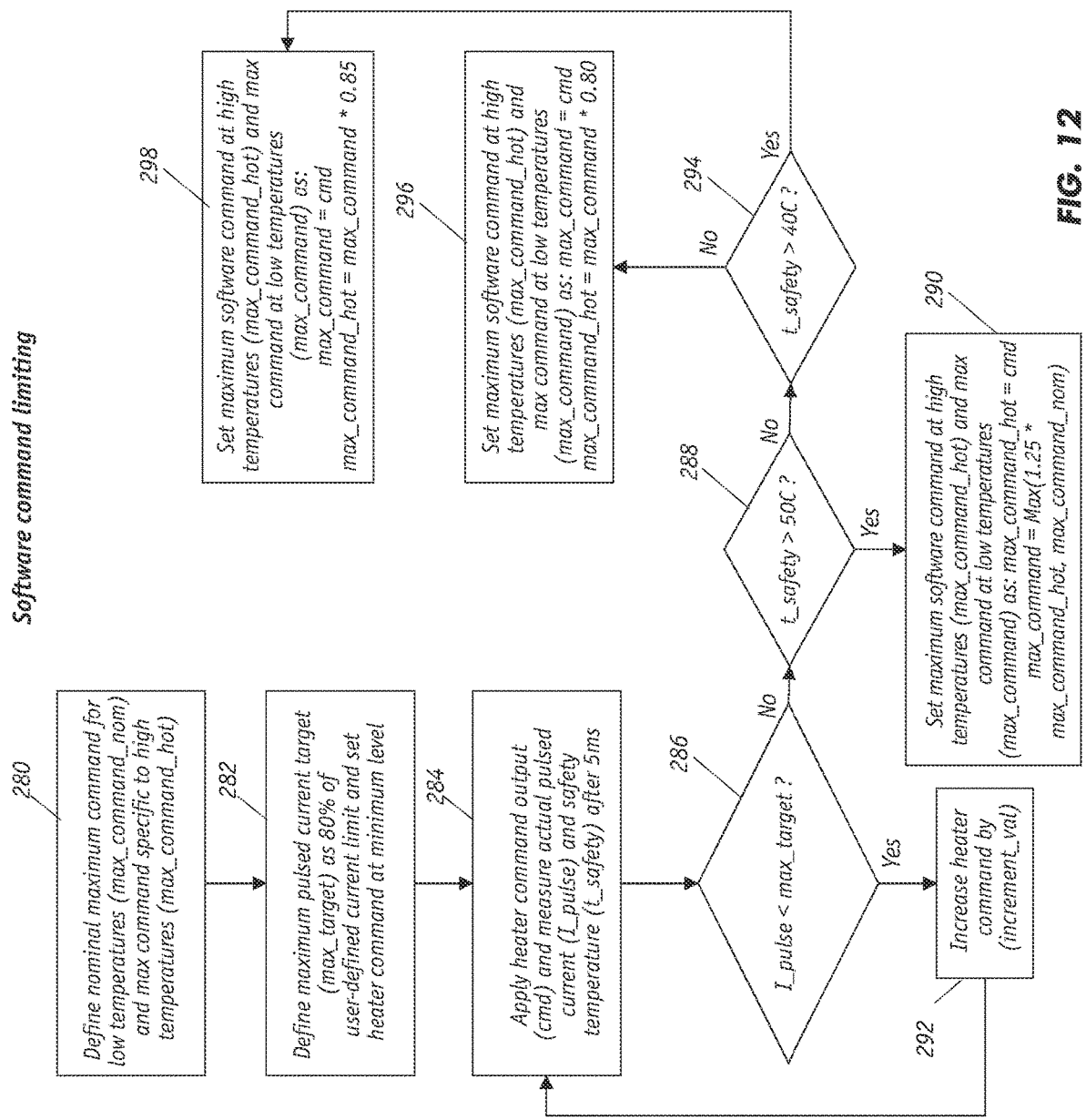
FIG. 12 is a flowchart for the controller operating in software command limiting.

FIG. 12 shows that when the controller initially powers on, it automatically calibrates the maximum software command such that the actual maximum heater current is consistent with the desired maximum heater current selected by the user in the controller's setting menu. It does this by applying short pulses of current and increasing the software command until 80% percent of the user-defined current limit is measured 282. It then measures the actual temperature of the system and sets the current limit according to whether the calibration routine is being performed at high temperatures 290, medium temperatures 296 or low temperatures 298.

In FIG. 12 the temperature controller allows a user-adjustable current limit to be defined 280, 282, 284, 292 for control output to the heating element that warms the heated fluid volume. It also includes current-sensing circuitry to monitor the actual current delivered to the heater. When the controller initially powers on, it ramps the software command value up until the desired current limit is measured on the current sensing circuitry 286. This software command value is subsequently used as an upper limit for calculated control outputs to the heating element. If the actual current delivered by the controller to the heating element exceeds the user-specified limit, then the controller incrementally reduces the maximum software command value without affecting normal operation. This allows the controller to dynamically adapt the maximum software command level to ensure that the user-specified current limit is not exceeded. The controller can also detect hardware issues by comparing the maximum software command value to predefined lower limits. If the command value is reduced below the predefined lower limit as a result of the overcurrent detection rules, then this means that there is something physically wrong with either the heating element or the controller itself, and it disables the heater output completely until the controller is powered off. This self-protection logic 288, 294 can prevent heating element failures from damaging the controller's drive circuitry and can generally alert the user that a hardware issue exists.

Figure 13:
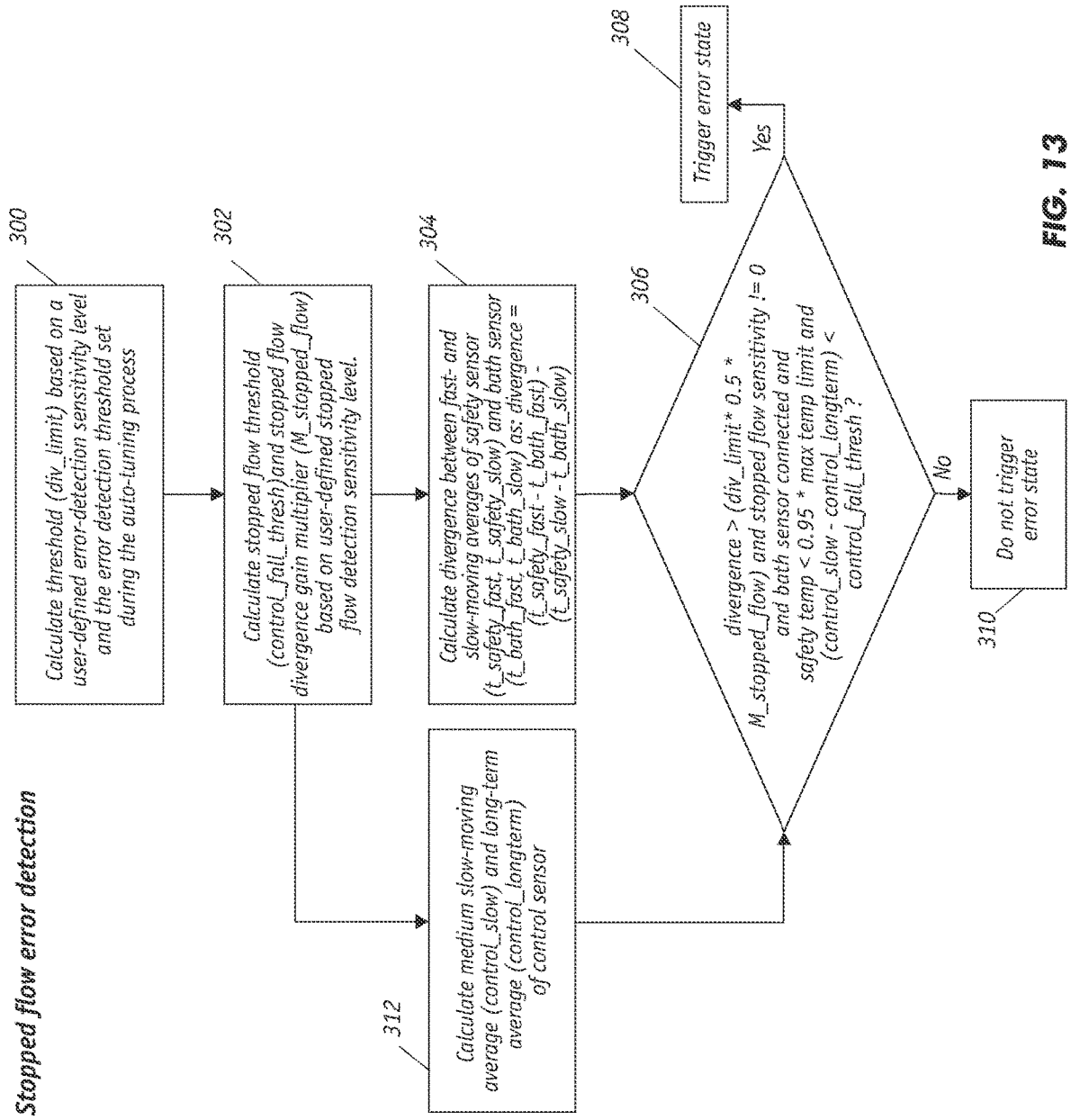
FIG. 13 is a flowchart for the controller detecting a stopped-flow error.

FIG. 13 shows the controller calculations 300, 302, 304, 312 in detecting 306 a stopped-flow error as depicted in FIG. 3. The temperature controller detects interruptions and executes appropriate actions 308, 310.

Figure 14A:
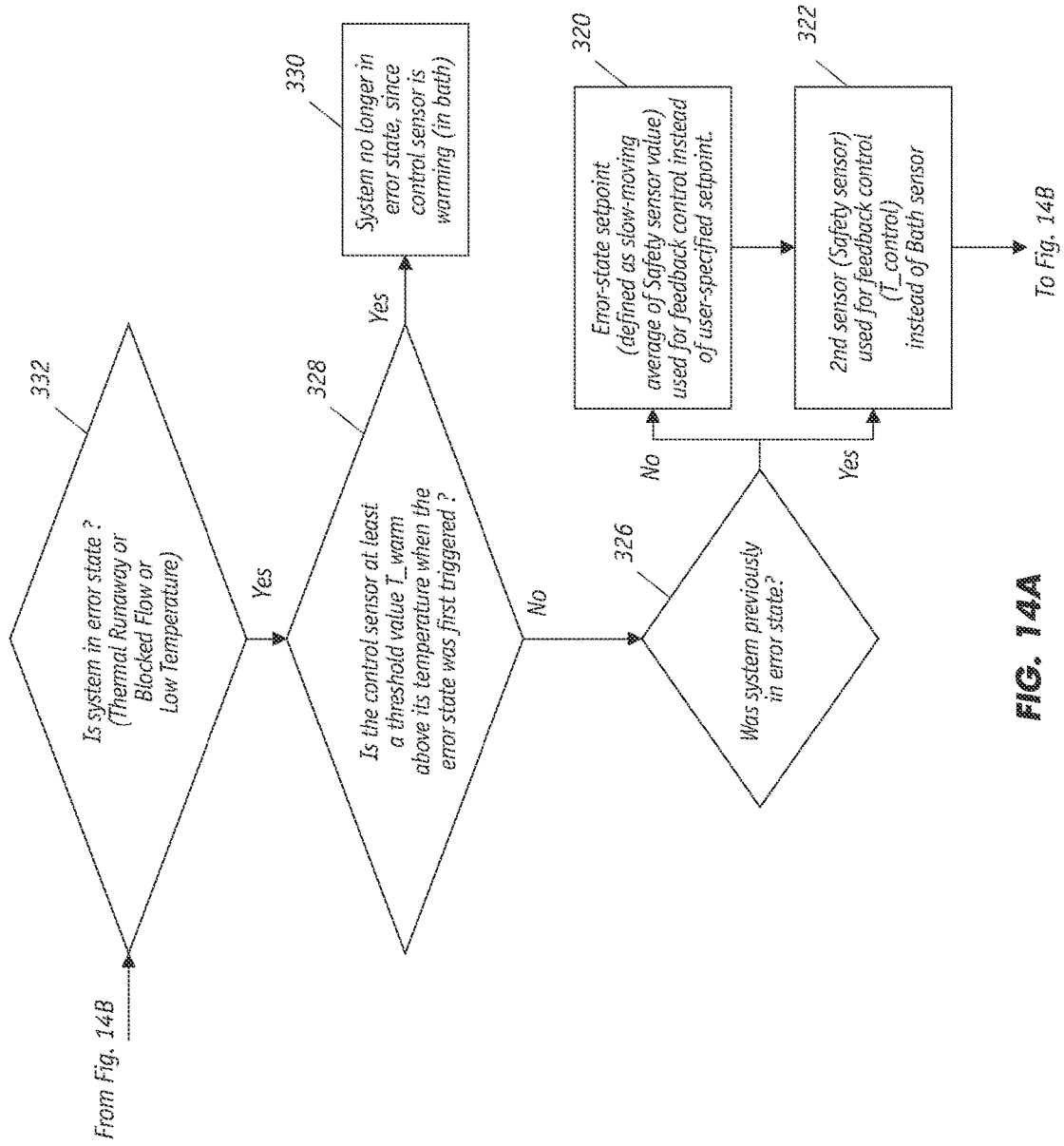

FIGS. 14A and 14B show the controller using the second temperature sensor to augment feedback control during normal operation or an error state. In particular, during normal operations 332, 328, 330, control temperature sensor 5 (FIG. 3) provides feedback for the controller 1 but when error states are detected 326, 320, 324, 344, 342 the controller uses either 340 the control temperature sensor 338 or the safety temperature sensor 4 as feedback 346 to maintain the heated volume temperature 336, 334.

The temperature controller is particularly suited for biological applications for controlling the temperature of a specimen (i.e., plant, animal, cell, liquid, proteins, etc.) or a specific region of a specimen (i.e., specific location on a neuron, brain, leaf, nose, etc.). With the inventive system, thermal runaway is detected when the control temperature drops and the safety/heater temperature increases—often long before the temperature of the heater reaches the destructive thermal-runaway cut-off point. Once thermal runaway has been detected, the controller can take actions to minimize the disturbance by, for example, turning the heater completely off, or switching the feedback temperature away from the control sensor to an earlier running average of the safety sensor. Once the flow of heat-conducting media has returned to normal, the control sensor's temperature rises rapidly. The device can detect this rise to determine that the thermal runaway situation has been corrected, and normal operations can resume.

Figure 15:
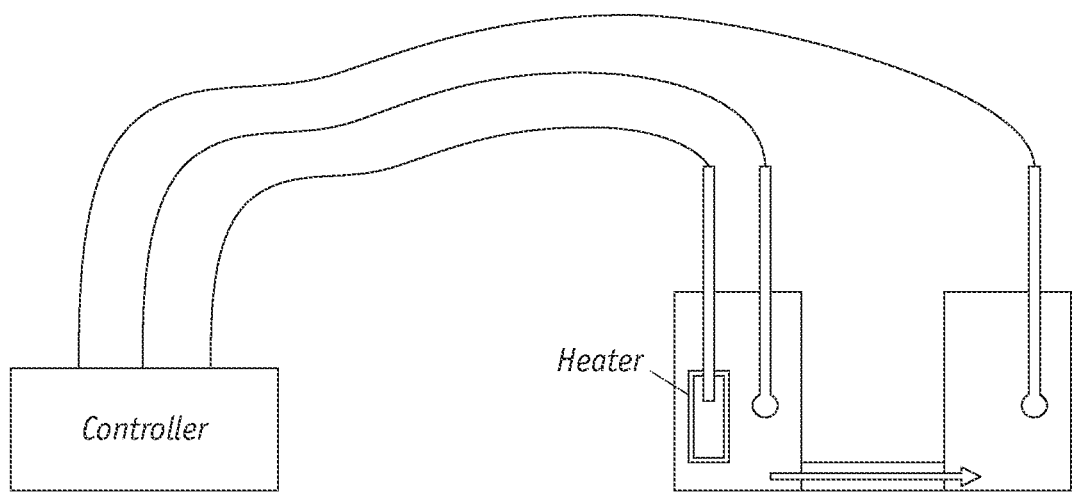
FIG. 15 depicts a heating apparatus with dual temperature sensors.
Figure 16:
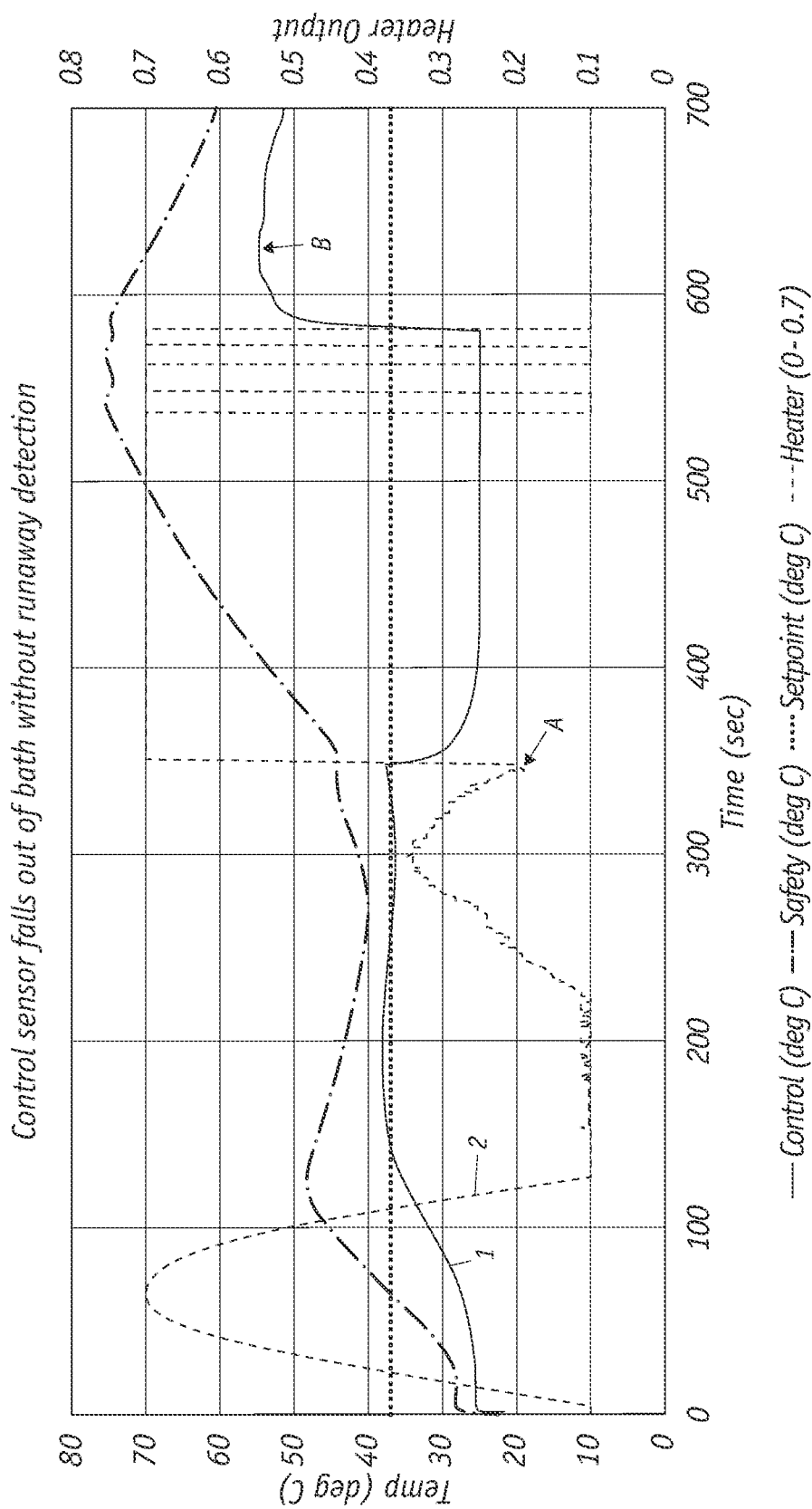
FIG. 16 is a graph showing the operations of the heating apparatus without runaway detection.

The operation of the inventive temperature controller was demonstrated using the system shown in FIG. 15 which included two water-filled beakers that are connected by plastic tubing which served as the transport conduit. The first vessel included a resistive heater and a control sensor and the second vessel included a safety sensor. The controller received signals from the control and safety sensors and regulated the electrical heating. The setpoint was 37° C. The graph in FIG. 16 shows the effects of the temperature controller with thermal runaway protection turned off, that is, not operating. The bath temperature represented by curve 1 was near the desired 37° C. setpoint from time 150 to 350 seconds when the control sensor was removed from the bath to simulate a user purposely or accidentally removing it. The temperature controller does not know the sensor was removed. It simply detected the temperature dropped steeply at time 350 seconds and in response, as shown at point A of curve 2 (heater output) the controller quickly ramped-up the heater until the safety sensor measured a temperature of a maximum of 75° C. When the control sensor is returned to the bath at time 575 seconds, the bath temperature had also risen well over the setpoint which could have permanently damaged the experiment. As shown at part B of curve 1, there was a large overshoot after the control sensor was repositioned in the bath.

Figure 17:
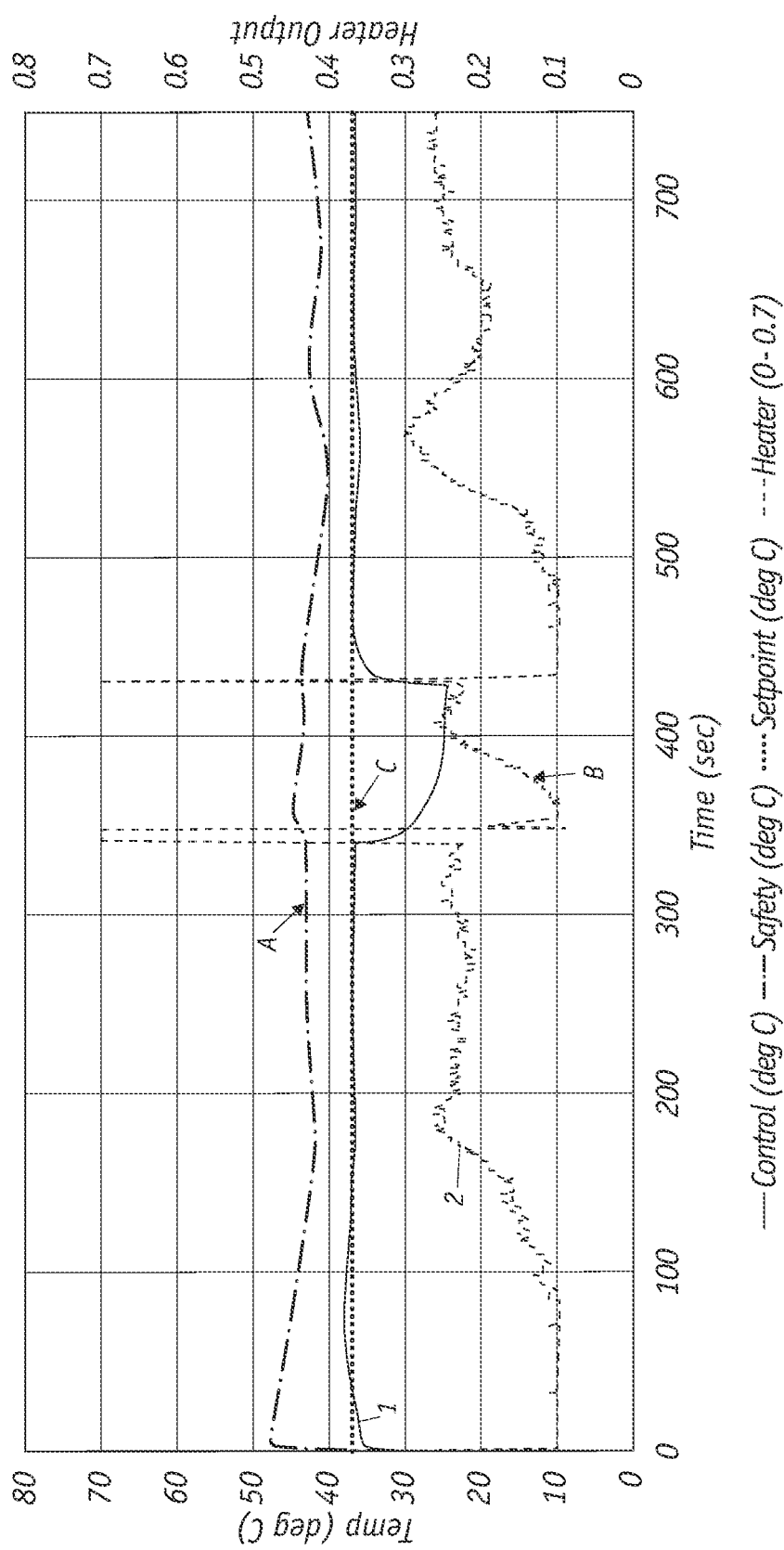
FIG. 17 is a graph showing the operation of the heating apparatus with runaway detection enabled.

The graph in FIG. 17 shows the results of a second demonstration where the thermal runaway protection of the temperature controller was turned on, that is, activated. Curve 1 is the bath temperature as measured by the control sensor and which remained at the desired 37° C. setpoint until the control sensor was removed after 340 seconds. In response to the drop in bath temperature, the controller rapidly increased the heater output at point A of heater output curve 2. However, this time, the controller recognized that the bath temperature was not increasing, and that the safety sensor showed that the heater was warming. From this information, the controller deduced that something had gone wrong and thermal runaway had begun. Instead, the controller switched to maintaining the heater's old or historical temperature as measured by the safety sensor. In particular, runaway detection was initiated at point B of curve 2 to prevent overheating of the bath. Later, when the control sensor is returned to the bath, the graph shows that the bath temperature was kept near the 37° C. setpoint without overshoot or damage. In particular, region C of curve 1 shows no large overshot after the control sensor is repositioned in the bath.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A temperature control system comprising:
    a first temperature sensor that measures a first temperature within a first region and generates first temperature signals;
    a second temperature sensor that measures a second temperature within a second region and generates second temperature signals;
    a heat-transfer element positioned in the second region that is configured to heat or cool the first region; and
    a controller which is configured to receive the first signals and the second signals and to regulate the heat-transfer element, wherein, during a normal condition the controller uses the first signals from the first temperature sensor to adjust the heat-transfer element to maintain a desired temperature in a feedback loop, and wherein the controller is adapted to determine
    (i) a first abnormal condition when the first temperature indicated by the first temperature signal is decreasing while the second temperature indicated by the second temperature signals is rising, wherein, in the first abnormal condition, rather than attempting to use the first signals from the first temperature sensor to adjust the heat-transfer element to maintain the desired temperature in a feedback loop, instead the controller sets the output of the heat-transfer element to enable recovery when the first abnormal condition ends; and
    (ii) a second abnormal condition when the first temperature indicated by the first temperature signal is increasing while the second temperature indicated by the second temperature signals is decreasing, wherein, in the second abnormal condition, rather than attempting to use the first signals from the first temperature sensor to adjust the heat-transfer element to maintain the desired temperature in a feedback loop, instead the controller sets the output of the heat-transfer element to enable recovery when the second abnormal condition ends.

2. The system of claim 1 wherein the heat-transfer element is configured to heat the first region and the controller is adapted to determine the first abnormal condition when the first temperature indicated by the a first temperature signal is decreasing while the second temperature indicated by the second temperature signals is rising, wherein, in the first abnormal condition, rather than attempting to use the first signals from the first temperature sensor to adjust the heat-transfer element to maintain the desired temperature in a feedback loop, instead the controller sets the output of the heat-transfer element to enable recovery when the first abnormal condition ends.

3. The system of claim 2 wherein the controller is adapted to determine the first abnormal condition when the first temperature indicated by the first temperature signal exhibits non-linear deviation from the second temperature indicated by the second temperature signals.

4. The system of claim 1 wherein the heat-transfer element is configured to cool the first region and the controller is adapted to determine the second abnormal condition when the first temperature indicated by the a first temperature signal is increasing while the second temperature indicated by the second temperature signals is decreasing, wherein, in the second abnormal condition, rather than attempting to use the first signals from the first temperature sensor to adjust the heat-transfer element to maintain the desired temperature in a feedback loop, instead the controller sets the output of the heat-transfer element to enable recovery when the second abnormal condition ends.

5. The system of claim 4 wherein the controller is adapted to determine the second abnormal condition when the first temperature indicated by the first temperature signal exhibits non-linear deviation from the second temperature indicated by the second temperature signals.

6. The system of claim 1 further comprising a conduit that connects the first region to the second region, wherein the heat-transfer element is configured to heat or cool a fluid in the second region.

7. The system of claim 6 wherein the conduit is configured so that fluid heated or cooled in the second regions flows through the conduit for at least about 1 to 5 seconds before entering into the first region.

8. The system of claim 6 wherein the fluid is a liquid or a gas.

9. The system of claim 8 further comprising a source of liquid or gas that flows through the conduit from the second region to the first region.

10. The system of claim 1 the controller is adapted to provide control signals to the heat-transfer element and to receive the first temperature signals and second temperature signals, the controller adapted to calculate changes in the first temperature signals and second temperature signals to regulate the heat-transfer element.

11. The system of claim 1 wherein the controller includes an application-specific integrated circuit (ASIC).

12. The system of claim 1 wherein the controller is configured to (i) use auto-tuning to adjust an integral gain setting to optimize feedback control of the heat-transfer element by alternately commanding the heat-transfer element to produce maximum heat to the second region and minimum heat to the second region, (ii) measure the first time required for the temperature in the first region to reach a first specified level above a normal temperature setpoint, (iii) measure the second time required for the temperature in the first region to reach a second specified level below the normal temperature setpoint, and (iv) calculate new gain settings based on the first and second times measured.

13. The system of claim 1 wherein the feedback loop is a proportional-integral-derivative (PID) controller feedback loop adapted to adjust the heat-transfer element so that the first temperature moves toward a setpoint temperature from a non-setpoint temperature.

14. The system of claim 13 wherein the controller determines an operation time required for the PID feedback loop to adjust the first temperature from the non-setpoint temperature to the setpoint temperature under current conditions and uses the operation time to auto adjust a parameter of the PID feedback loop.

15. The system of claim 1 wherein the controller uses fuzzy logic by grouping temperature measurements by the first and second temperature sensors and auto-tuning calculations into one of a plurality of groups to further optimize feedback characteristics of control of the heat-transfer element.

16. The system of claim 1 wherein the first region does not include a heat-transfer element.

17. A method of controlling the output of a heat-transfer element that is positioned in a second zone wherein the output is directed into a first zone, which comprises:
(a) measuring a first temperature of a first fluid medium in the first zone;
(b) measuring a second temperature of a second fluid medium in the second zone; and
(c) employing a controller to regulate the heat-transfer element in response to temperature measurements made in step (a), step (b) or both steps (a) and (b), wherein the controller prevents thermal runaway of the temperature in the first zone.

18. The method of claim 17 wherein the first zone is connected to the second zone by a heat-transfer conduit through which the second fluid medium travels into the first zone.

19. The method of claim 18 wherein the conduit is configured so that the second fluid medium flows through the conduit for at least about 1 to 5 seconds before entering into the first region.

20. A method of warming or cooling a sample that comprises:
(a) placing the sample in a vessel;
(b) activating a heat-transfer element which is located in a region that is remote from the vessel supply a warm or cold fluid into the vessel through a heat-transfer conduit that is in communication with the vessel;
(c) measuring a first temperature in the vessel;
(d) measuring a second temperature in the region; and
(e) regulating the heat-transfer element with a controller in response to step (c), (d) or both (c) and (d), wherein the controller prevents thermal runaway of the temperature in the vessel.

21. The method of claim 20 wherein the vessel is connected to the region by a heat-transfer conduit through which the warm or cold fluid travels into the vessel.

22. The method of claim 21 wherein the conduit is configured so that the warm or cold fluid flows through the conduit for at least about 1 to 5 seconds before entering into the vessel.

23. The method of claim 20 wherein the sample is a biological specimen.

* * * * *